July 20, 1954      S. R. CARSON      2,683,928
METHOD OF CORRUGATING TUBING

Filed Sept. 12, 1950

INVENTOR
STANLEY R. CARSON
BY
Willits Hardman & Fehr
HIS ATTORNEYS

Patented July 20, 1954

2,683,928

UNITED STATES PATENT OFFICE 2,683,928

METHOD OF CORRUGATING TUBING

Stanley R. Carson, Dayton, Ohio, assignor to General Motors Corporation, Detroit, Mich., a corporation of Delaware Application September 12, 1950, Serial No. 184,417

4 Claims. (Cl. 29—523)

This invention relates to a method of forming integral peripheral beads or flanges on the surface of metal tubes of round or near-round cross section and having walls of substantial thickness, the method being usable either in the manufacture of beaded or flanged tubing for sale as such, or as a step in the manufacture of other articles including such beaded or flanged tubing as a part thereof.

An object of this invention is to provide a very simple and economical method of forming such integral beads or flanges by first forming pairs of small peripheral grooves in the outer surface of a plain metal tube and then compressing the tube endwise with a snugly fitting mandrel therein to cause the metal thereof to flow outwardly and form substantially uniform section solid peripheral beads or flanges on said metal tube.

Another object is simultaneously to provide a series of such beads or flanges spaced along the length of the metal tube by a single endwise compression operation on said tube, the location, sectional shape and size of said beads being predetermined by the location, shape and spacing of the pairs of grooves formed in said tube.

Another object is to provide a method of using my invention in assembling an article such as a bushing of resilient rubber or other resilient material compressed between an inner metal tube beaded or flanged according to my novel method, and an outer retaining shell whereby the resilient bushing is permanently secured in place under compression. Such units may be used as cushioning mountings and oscillating pivot joints wherein the relative movement between the inner metal tube and the retaining shell is taken by internal distortion of the resilient bushing and without any relative sliding movement between the parts.

Other objects and advantages of the present invention will be apparent from the following description, reference being had to the accompanying drawings wherein a preferred embodiment of the present invention is clearly shown.

Figure 4:
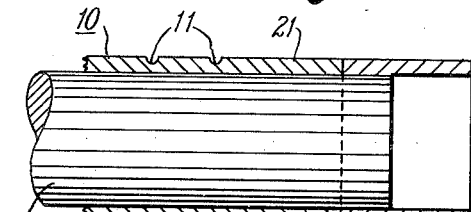
Figure 5:
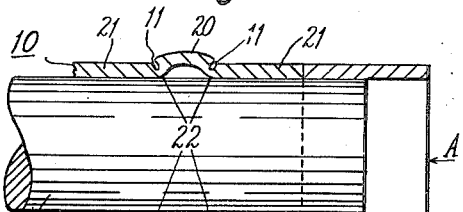
Figure 6:
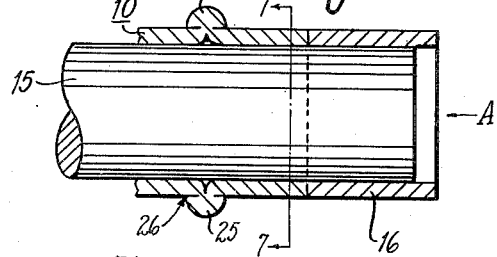

Figs. 4, 5 and 6 are partial sectional views, on an enlarged scale, illustrating progressive flowing of the metal while forming the beads according to this invention by endwise compression of the ground tube. More specifically, Fig. 4 shows the grooved tube and compression ring assembled upon an interior mandrel, before the endwise compressing force is applied; Fig. 5 shows the metal of the tube between two adjacent grooves beginning to flow and bulge outwardly away from the interior mandrel; and Fig. 6 illustrates the final formation of one bead.

Figure 7:
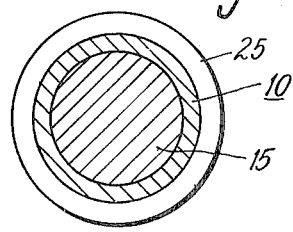

Fig. 7 is a section on line 7—7 of Fig. 6.

Figure 8:
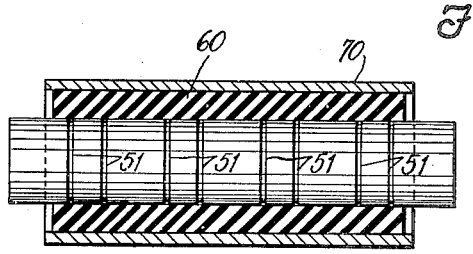
Figure 9:
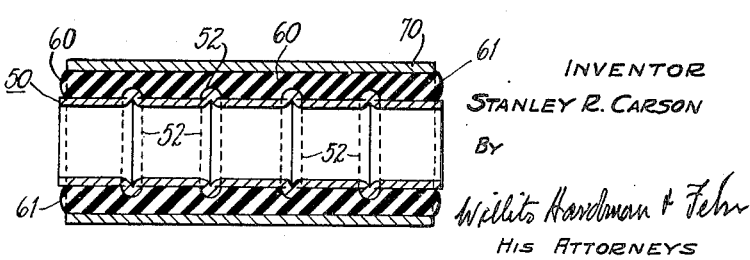

Figs. 8 and 9 show an application of the method of this invention in making a joint unit comprising a corrugated or beaded inner tube and an outer retaining shell having a resilient rubber bushing held permanently compressed therebetween. Fig. 8 illustrates the assembly prior to compressing the inner tube endwise to form the corrugations or beads therein. Fig. 9 shows a longitudinal section thru the final joint unit.

Figure 3:
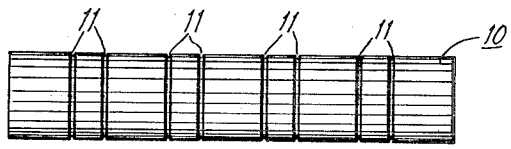
Fig. 3 is a side view of the metal tube, having four pairs of spaced peripheral grooves therein, as used in making the beaded tube of Figs. 1 and 2.
Figure 1:
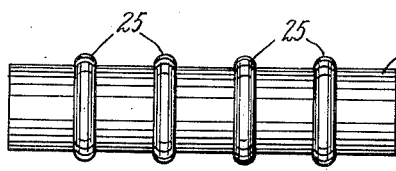
Fig. 1 is a side view of a metal tube having four peripheral beads thereon made according to this invention.
Figure 2:
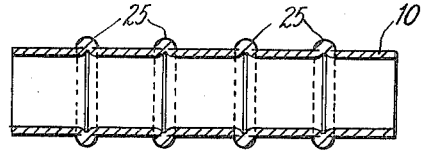
Fig. 2 is a longitudinal section thru the tube of Fig. 1.

In the specification wherein similar reference characters refer to similar parts throughout the several views, I have illustrated my novel process as applied to a piece of steel tubing 10, seamless or welded, 3½ inches long, five-eighths inches O. D. and having a wall thickness of approximately one-sixteenth inch. Four pairs of narrow grooves 11 are cut therein as shown in Fig. 3. Each pair of grooves 11 are spaced closer together than the spacing between adjacent pairs of grooves. In Fig. 3 the center lines of the grooves of each pair 11 are spaced one quarter inch apart while the next adjacent center line is spaced one-half inch. The width of grooves 11 is approximately three sixty-fourths inch and said grooves are approximately half round in cross section and preferably have a depth of from one-fourth to one half the wall thickness of tube 10 (see Fig. 4).

Tube 10 is slipped upon a snugly fitting interior mandrel 15 which prevents otherwise possible radially inward bulging or flow of the metal of the walls of tube 10 when it is subjected to high endwise compression. Fig. 4 shows how tube 10 may be subjected to a high endwise compressing force (indicated by arrow A) which acts thru the compression sleeve 16 which telescopes upon the projecting end of mandrel 15. The opposite end of tube 10 is of course supported by a suitable stationary abutment which reacts against the compressing force A. The assembly shown in Fig. 4 may be inserted between the platens of a hydraulic press to obtain the endwise compressing force A by forcing sleeve 16 endwise against the end of tube 10. No exterior support around the outside of tube 10 during its endwise compression is required. The nonnecessity of any exterior die for shaping the beads to be formed on tube 10 greatly simplifies and reduces the cost of the entire operation, as will be clearly appreciated by those skilled in the art of shaping metal by means of dies.

Fig. 5 illustrates what is believed to be the manner in which the metal begins to bulge radially outward between a pair of the adjacent grooves 11 while said grooves are closing together due to the endwise compression on tube 10. The tube 10 being weakest at the grooves 11 naturally begins to give way and flow at said grooves under the stress of the endwise compression. For a reason not precisely clear to me, the portions 20 of tube 10 lying between each pair of the more closely spaced grooves 11 will bulge radially outward while the intervening portions 21 of tube 11 will not so bulge outward but will remain substantially non-distorted and in contact with mandrel 15. Now as soon as these portions 20 have bulged only slightly out of alignment with the portions 21 of tube 10 and become offset to the compressing force thereupon, further outward bulging of the offset portions 20 is greatly facilitated due to such offset, while the end portions 22 of intervening portions 21 close in axially toward one another as the entire tube 10 is shortened by the endwise compression thereupon. While said end portions 22 are being forced together or nearly so, the metal in said portions 20 flows into smooth-surfaced rounded beads 25 (see Fig. 6) having the general appearance of having been shaped by a die. In the specific example here described the beads are approximately half round in cross section and about three thirty-seconds of an inch high. All four beads 25 will be formed during one endwise compressing operation and will be substantially uniform in shape and dimensions since the pairs of the original grooves 11 were uniform in size, shape and spacing.

The height of any bead 25 may be increased beyond that of the above example simply by increasing the spacing between the pair of grooves provided to form such bead 25. It is not necessary that the various beads formed on a single tube be of equal size or equally spaced apart, since the size and location of the beads on the tube depends upon the spacing and location of the small grooves initially cut in the tube. The cross section shape of said grooves may vary considerably from the half-round grooves described above. The section of the grooves determines to some extent the section of the beads ultimately formed. For instance, a pair of triangular section grooves will provide a bead of a different cross section from that provided by semi-circular grooves.

Figs. 8 and 9 show an oscillating pivot joint unit wherein the final compression upon the resilient rubber bushing is obtained by forming radially projecting beads on the inner metal tube by the method described above. Similar oscillating pivot joint units are well known, but heretofore such joints have been assembled by more difficult or costly methods. In Fig. 8 the inner metal tube 50, having pairs of grooves 51 cut therein, is inserted endwise thru a resilient bushing 60 (of rubber or the like) which is held against outward expansion by the retaining outer metal shell 70. Since the grooved tube 50 has no radial projections thereon at the time it can readily be forced into position within bushing 60 with a tight fit and thereby put the resilient bushing 60 under a material radial compression at the time of such insertion, if so desired.

After the assembling of grooved tube 50 within bushing 60 and outer shell 70, as shown in Fig. 8, a snugly fitting mandrel is inserted thru tube 50 and said tube 50 is compressed endwise, such as by a hydraulic press, to force the portions of tube 50 lying between each pair of grooves 51 into the radially projecting beads or flanges 52, according to the method described hereinabove. These flanges 52 must displace their volume in the resilient material of bushing 60 and thereby compress said resilient material and cause it to flow in an axial direction and bulge outwardly at the open annular end areas as shown at 61 in Fig. 9. The flanges 52 also serve to interlock and bond the inner metal tube 50 with the rubber bushing 60 so as to prevent relative sliding of tube 50 and bushing 60 during operating use of the joint unit. The bushing 60 may be bonded by vulcanization or otherwise fixed to the outer shell 70, or simply held against relative sliding thereupon by the compression in the rubber. In such a joint unit, all relative motion, either rotary or axial, between inner tube 50 and outer shell 70 is taken by internal distortion in the rubber bushing 60. It should be noted that since flanges 52 are formed simultaneously they in effect divide the bushing 60 into a series of individually compressed longitudinal sections which are interconnected by the annular necks of rubber (opposite flanges 52) which are held retained in place under relative high radial compression.

While the embodiment of the present invention as herein disclosed, constitutes a preferred form, it is to be understood that other forms might be adopted.

What is claimed is as follows:

1. The method of forming a solid peripheral bead or flange projecting from the surface of a metal tube which includes the steps of; forming two longitudinally spaced peripheral grooves on the outer surface of said metal tube so as to reduce the thickness of the tube at the groove, placing said tube on a closely fitting mandrel, and applying endwise force upon opposite ends of said tube and thereby causing the metal thereof lying between said grooves to flow unconfined and outwardly from said mandrel into the form of a solid peripheral bead on said tube having a substantially smooth rounded cross section.

2. The method of forming a solid peripheral bead on and projecting from the surface of a metal tube which includes the steps of; forming in the outer surface of the metal tube, two longitudinally spaced peripheral grooves each having a relatively narrow width compared to the axial spacing therebetween so as to reduce the thickness of the tube at the groove, placing said tube on a mandrel fitting snugly on the wall of the tube opposite to the wall containing said grooves, then compressing said tube endwise and causing the metal thereof between said grooves to bulge and flow freely away from said mandrel and form a substantially solid peripheral bead upon the original wall surface of said tube.

3. The method of forming a plurality of peripheral flanges or beads projecting from the outer surface of a metal tube which includes the steps of; forming a plurality of pairs of exterior peripheral grooves spaced along the length of a metal tube so as to reduce the thickness of the tube at the groove, placing said tube on a snugly fitting mandrel, then compressing said tube endwise and causing the metal thereof between each pair of said grooves to bulge and flow outwardly into the adjacent space unconfined by any shaping member and form substantially solid outer peripheral flanges on said tube while the portions of said tube between the flanges thus formed retain substantially the original tubular dimensions.

4. The method of permanently assembling a bushing of resilient material compressed between an inner metal tube and an outer retaining shell which includes the steps of; forming a plurality of spaced pairs of exterior peripheral grooves on the inner metal tube so as to reduce the thickness of the tube at the groove, sliding said grooved inner tube endwise thru a closely fitting bushing of resilient material and assembling said bushing and grooved tube inside of an outer retaining shell, passing a snugly fitting mandrel within said grooved tube, then compressing said grooved tube endwise with such a force as to cause the metal thereof between each pair of said grooves to bulge outwardly and form radial flanges projecting into the material of said resilient bushing and thereby compressing the material of said bushing.

References Cited in the file of this patent

UNITED STATES PATENTS

| Number | Name | Date |
|---|---|---|
| 1,095,100 | Fulton | Apr. 28, 1914 |
| 1,270,402 | Fulton | June 25, 1918 |
| 1,288,132 | Nagle | Dec. 17, 1918 |
| 1,734,025 | Zeibig | Oct. 29, 1929 |
| 1,734,932 | Weed | Nov. 5, 1929 |
| 1,961,453 | Quarnstrom | June 5, 1934 |
| 2,118,499 | Durbin | May 24, 1938 |